Sept. 12, 1967  E. J. CIABATTARI ETAL  3,341,450
GASIFICATION APPARATUS AND METHOD
Filed Oct. 24, 1965  2 Sheets-Sheet 1
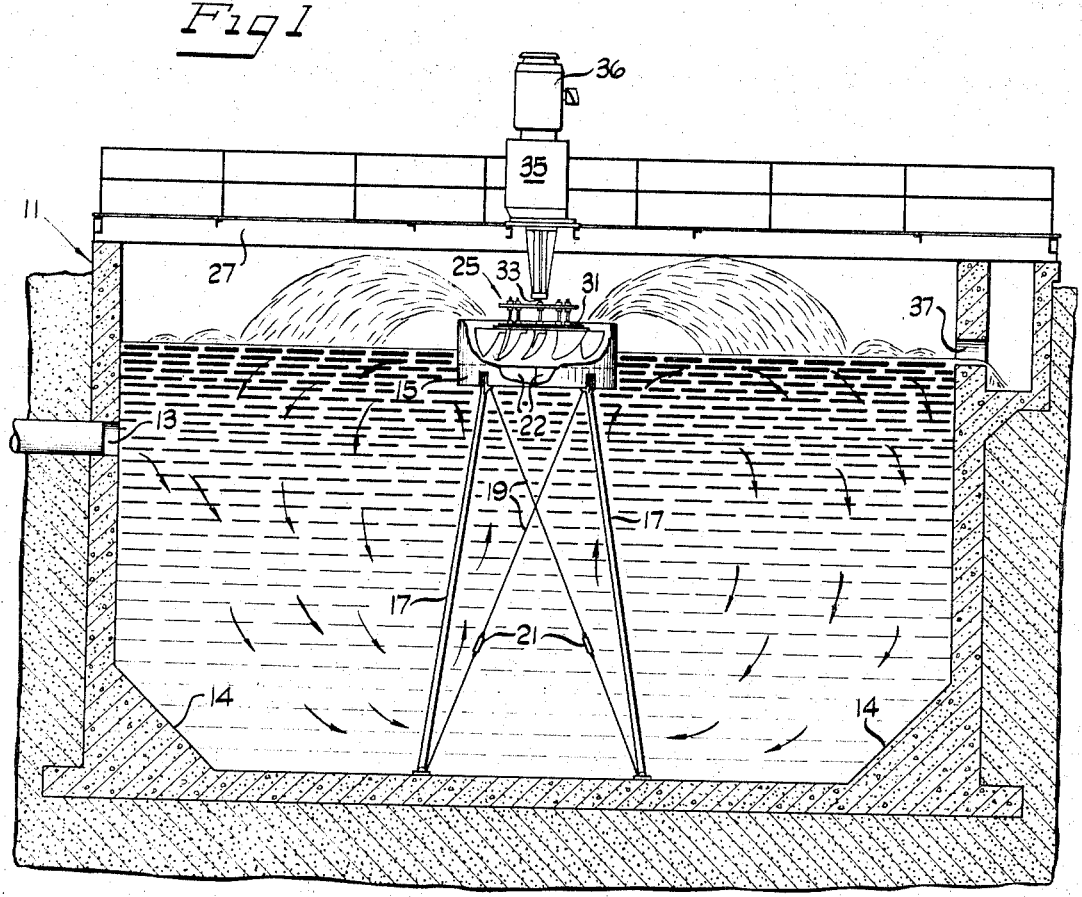
Fig 1
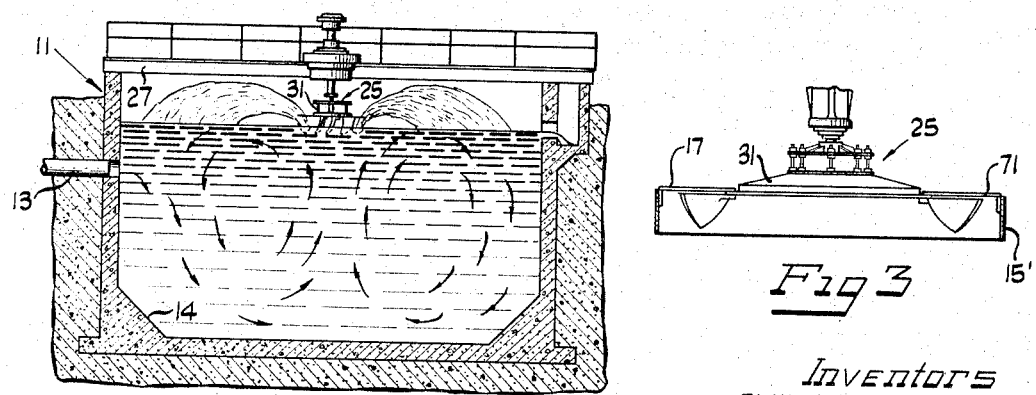
Fig 2
Fig 3
Inventors
EMIL J. CIABATTARI
RICHARD J. NOGAJ
By Anderson, Luedeka, Fitch, Even & Tabin
Atty's

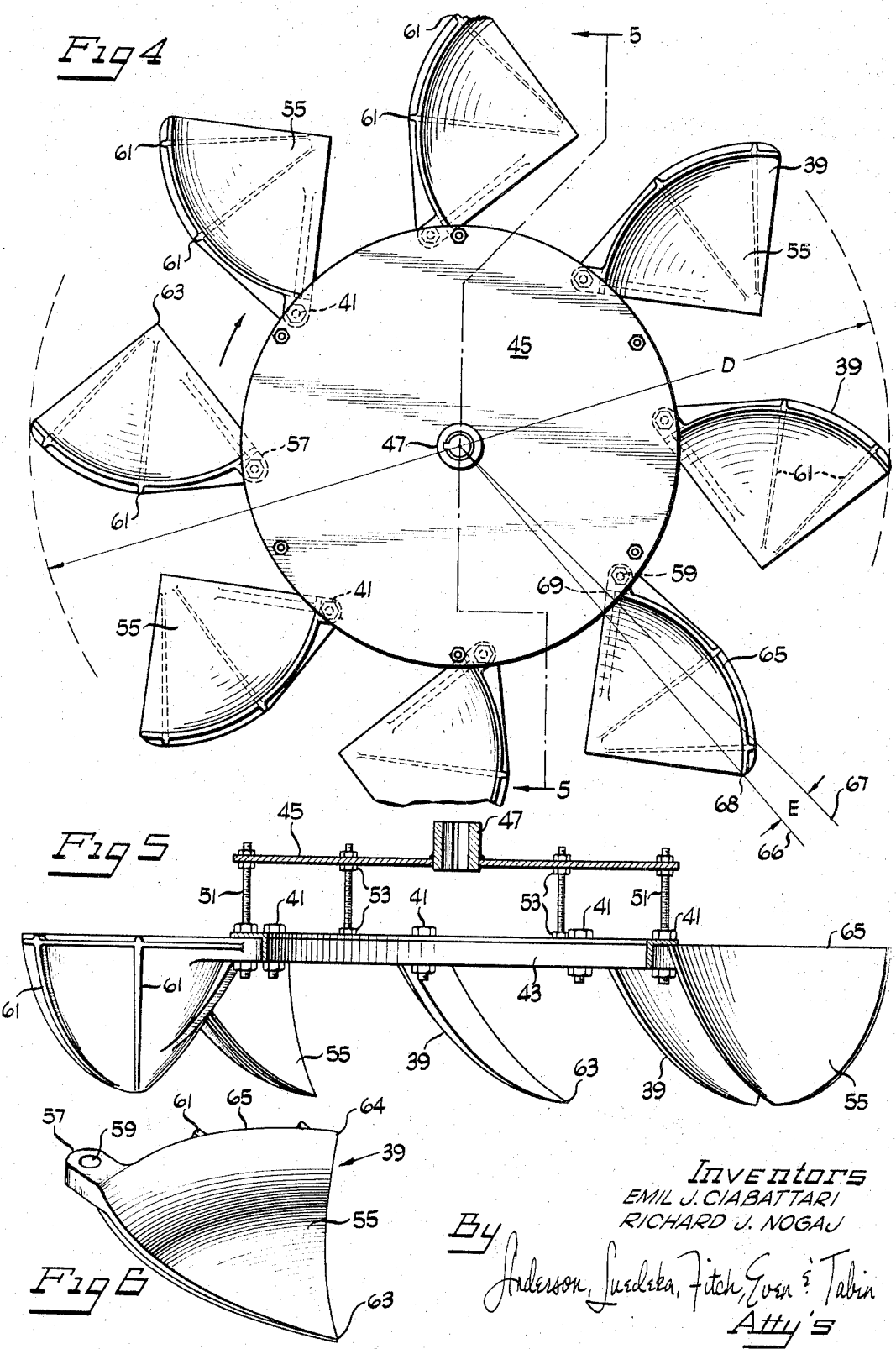

United States Patent Office 3,341,450
Patented Sept. 12, 1967

3,341,450
GASIFICATION APPARATUS AND METHOD
Emil J. Ciabattari, Melrose Park, and Richard J. Nogaj, Winfield, Ill., assignors to Yeomans Brothers Company, Melrose Park, Ill., a corporation of Delaware
Filed Oct. 24, 1965, Ser. No. 504,701
10 Claims. (Cl. 210—63)

The present invention relates to aeration and more particularly it relates to aeration means which is especially adapted for the treatment of waste materials, such as municipal and industrial waste.

In the treatment of waste materials by aeration, the materials are usually processed to remove settleable solids, as by screening and/or settling. The supernatant liquid from this initial or primary treatment is then subjected to aeration in an aeration tank. Two aeration methods have been extensively used to effect aeration of the mixture being treated.

One of the aeration methods utilizes porous plates or other perforated bodies through which compressed air is distributed into the aeration tank. This method, sometimes known as the diffused-air method, produces satisfactory aeration.

The other aeration method is termed mechanical aeration and involves the use of a power-driven, mechanical aerator. Mechanical aerators are of two general types, one type being a surface aerator and a second type being a submerged aerator. A surface aerator usually effects surface agitation which causes the fluid to incorporate air in the zone of agitation, whereas a submerged aerator such as the Waldhof aerator, injects air into the fluid by means of the rotor and an associated conduit. A well known surface aerator is shown in United States Letters Patent No. 2,802,647. This aerator includes a rotor that is generally conical in shape and carries a series of vanes or blades. The rotor is associated with and positioned above a downwardly extending draft tube that is mounted generally centrally of an aeration tank. Rotation of the rotor draws liquid upward through the draft tube, spreading it over the surface of the tank.

Mechanical surface aerators have proven reliable and give good service. However, higher efficiencies are desired so that greater amounts of air or gas can be incorporated into fluids.

Heretofore, most mechanical aerators when used in the treatment of waste materials have been operated in combination with draft tubes in order to effect proper circulation in the aeration tank. Circulation in the tank is created by the mechanical aerators which cause the movement of liquid through the draft tube and create currents along the bottom of the aeration tank. This circulation keeps the liquid throughout the aeration tank in movement and prevents solids from gathering in the aeration tank, which, in the case of sewage, may become septic.

Surface mechanical aerators have utilized generally flat vanes or blades to accomplish the desired action, while submerged mechanical aerators have been made with various shapes. Some surface mechanical aerators have utilized a type of blade which is curved in the vertical plane (the axis of curvature being a vertical line). An example of this latter type of aerator is illustrated in the previously mentioned Patent No. 2,802,647. Although satisfactory aeration has been accomplished by these aerators, greater efficiency is always desired.

It is an object of the present invention to provide improved aeration means and to provide improved methods and apparatus for carrying out aeration.

It is a further object to provide improved mechanical aeration apparatus and particularly to provide such apparatus of the surface type.

It is another object of the invention to provide improved mechanical aeration apparatus which efficiently aerates a body of liquid while establishing a circulation which is adequate to prevent the settling of solids.

It is a still further object of the invention to provide an improved method of mechanical aeration and improved apparatus capable of carrying out this method efficiently with or without the usual draft tube.

These and other objects of the invention are more particularly set forth in the following detailed description and in the accompanying drawings wherein:

FIGURE 1 is an elevational view, partially in cross section, which illustrates improved aeration apparatus embodying various features of the present invention and includes a central baffle;

FIGURE 2 is a view, similar to FIGURE 1, reduced in size, of another embodiment of the aeration apparatus illustrated in FIGURE 1 without a central baffle;

FIGURE 3 is an enlarged elevational view, partially in section, of a modified form of a portion of the aeration apparatus shown in FIG. 1;

FIGURE 4 is an enlarged plan view of a portion of the aeration apparatus shown in FIGURE 1;

FIGURE 5 is a sectional view taken along line 5—5 of FIGURE 4; and

FIGURE 6 is an enlarged perspective view of a part of the aeration apparatus shown in FIGURE 4.

The aeration means of this invention is of the mechanical surface aeration type. It employs a rotor having a plurality of blades or scoops mounted on a rotor having a vertical axis driven by a power source. Each scoop has an upwardly sloping or concave surface, which faces in the direction of rotation and which has a leading lower front edge and an upper trailing rear edge. The front edge is substantially narrower than the rear edge and is preferably a point. The front edge of the scoop dips into the fluid to a depth which is equivalent to a major fraction of the height of the scoop, below the static fluid level in the tank so that the fluid flows up and spreads out on the scoop. The trailing edge of the scoop is located above the static fluid level in the tank. The fluid, when delivered to the upper trailing edge of the scoop, is moving upwardly and the edge tends to shear the fluid as it leaves the scoop.

As the plowed-up fluid ascends the sloping front face of the scoop and leaves the trailing edge of the scoop, it is thrown upwardly. The fluid is also thrown rearwardly along a tangent to the circle of rotation of the scoop. The fluid is thrown a considerable distance upwardly and falls substantially outwardly of the circle of rotation of the scoop, so that the fluid remains suspended in the air for a period before returning to the surface in a receiving zone which extends substantially outwardly from the circle of rotation or pick-up zone within which the scoop rotates.

This arrangement and method of operation effects a continuous movement of fluid from a central region of the tank to its outer region, thereby developing a circulation within the tank which acts to prevent the formation of untreated regions of liquid or settling of solids. Under most conditions, the circulation is adequate without the use of an extended draft tube such as is described in U.S. Patent No. 2,806,647, previously referred to. However, it may be desirable to include a tubular baffle or shortened draft tube around the circle of rotation to reduce surging which may develop in a system of this type as a result of the physical characteristics in the tank.

Intimate contact between the atmosphere and the fluid picked up by the scoop is effected by delivering the liquid from the scoop in a sheet which is relatively thin. The design of the scoop is such as to facilitate the provision of such a film. This thin film of fluid which leaves the trailing edge of the scoop or blade is facilitated by the forming of the scoop to widen in a direction upwardly and rearwardly of its plowing end so that the upper edge has an edge of substantially greater length than the lateral width of the cross section of the scoop at its front or plowing end. By delivering the liquid in the form of a thin sheet, it is caused to separate into a shower or spray of droplets promptly after leaving the scoop. The separated droplets are efficiently aerated during their flight through the atmosphere to the receiving zone of the fluid in the tank.

In its preferred form and for most effective operation, the scoop comprises a section of a sphere and will be more particularly described hereinafter.

Although the invention is suitable for the aeration or gasification of various fluids, it is described in association with the aeration of fluid waste or sewage, for which it is considered to be particularly well adapted. As illustrated in the drawings, the system includes an aeration tank 11, into which waste is introduced through an inlet 13. Preferably, the inlet 13 is located below the surface of the fluid in the tank to provide proper mixing of the incoming sewage with the material already in the tank; however, other arrangements may be used. The tank 11 may be round, square, or rectangular in horizontal cross section, and its volume generally determines the size or capacity of the aerator used. The bottom of the tank should be inclined along its sides, as shown in the drawings (FIGURES 1 and 2), to eliminate potential dead spots in corners where settling out of solids might occur. The steepness of these sloping bottom sidewalls 14, in combination with the circulation which is created throughout the tank, keeps the walls generally free from slime and deposited solids.

As shown in FIGURE 1, a cylindrical baffle 15 is supported centrally in the tank 11 by a plurality of struts 17 which are interconnected by stays 19 including turnbuckles 21 which allow for the adjustment of the tension of the struts. As before indicated, the baffle 15, has the purpose of controlling surging which may periodically occur as a result of tank design and dimensions, and aerator operating conditions. In some applications, surging is not a problem and the baffle may be eliminated. The cylindrical baffle 15 comprises a pair of plates 22 which intersect each other at 90° and serve as internal baffles to control vortexing.

FIGURE 2 illustrates circulation within the tank 11 and aeration of the fluid without the use of a baffle 15. A full length draft tube may be employed, if desired, but it is not considered necessary with the improved aerator of this invention. The baffle 15 surrounds an aerator rotor 25 and extends upwardly to approximately the top of the rotor blades.

The rotor 25 is shown carried by a suitable support, such as a bridge 27 extending completely across the tank 11. The aerator rotor 25 includes a rotor assembly 31 mounted on a vertical shaft 33 that extends downwardly from a gear box 35 of an electric motor 36 by which the rotor assembly 31 is driven.

Fluid sewage entering the tank 11 through the inlet 13 is maintained in constant circulation within the tank by the action of the aerator rotor 25. The rotor 25 picks up fluid within the cylindrical baffle 15 and discharges it into the atmosphere. Because of the design of the rotor assembly 31, as will be hereinafter described in detail, the fluid is discharged above the fluid level in the form of relatively thin sheets which quickly disperse into droplets, moving upwardly and more or less tangentially to the direction of rotation.

The unique design of the rotor assembly 31 not only promotes very efficient oxygen absorption in the fluid but, in addition, creates excellent circulation throughout the tank 11 and keeps solids from settling out of the fluid mixture. The rate of rotation of the rotor assembly 31 is regulated so that settling out of solids is substantially prevented and scouring of the tank bottom occurs.

If desired, part of the treated fluid may be continuously removed from the aeration tank 11 and conveyed to a settling tank (not shown) through an outlet 37. In such a settling tank, sludge may be separated from the fluid with part of the sludge being used to inoculate additional amounts of entering sewage and the remainder of the sludge being removed to other sludge treatment operations, for example to a sludge digester. Thus, aeration apparatus of this invention can be operated on a continuous basis with continuous feed into the tank and continuous outflow, once the contents of the tank have been aerated sufficiently to bring the dissolved oxygen level to the desired point.

As shown in the embodiment illustrated in FIGURES 3, 4 and 5, the rotor assembly 31 has eight circumferentially spaced scoops or blades 39 adjustably secured, as by bolts 41, to a generally horizontal circular ring 43. The ring 43 is hung from a disc 45 carried by the rotatable shaft 33. In this connection, the shaft 33 is keyed to a central hub 47 which is welded or otherwise connected to the disc 45. Threaded vertical rods 51 and suitable nuts 53 are employed to hang the ring 43 from the disc 45.

As best seen in FIGURE 5, the blades 39, as herein illustrated, are of the "orangepeel" crane-bucket type and have a concave front surface 55 which, in the illustrated embodiment, is a one-eighth section of the surface of a sphere. Because it is a spherical section, the front surface 55 is curved both in the horizontal plane and in the vertical plane. The lower end of the blade 39 extends forwardly and downwardly to a point 63. The upper edge 65 of the blade 39 extends generally horizontally.

Each of the blades 39 has a lug 57 that is apertured to receive the bolts 41 by which they are clamped in any desired angular position on the rim 43.

Each of the blades 39 has integrally formed reinforcing ribs 61 on its rear surface to permit the overall thickness of the blade to be reduced and provide desired strength and rigidity.

The correct design of the blades 39 is important to obtain optimum efficiency of the present invention so that the rotor 25 produces good circulation and aeration performance per horsepower-hour expended. Each of the illustrated blades 39 is a section of a sphere of a 13 inch radius.

For good results, it has been found that both the radius of the sphere from which the segment is taken and the length of the curved trailing horizontal edge 65 should be a minor fraction of the maximum diameter of the rotor assembly 31, i.e., the diameter of the circular path of the outermost tips of the blades, this diameter being represented by the reference letter D in FIGURE 4. In sewage treatment, the diameter D of the rotor assembly 31 is desirably not more than about one-third of the maximum width of the tank, when a single aerator in a single tank is employed.

The dimensions of the rotor assembly 31 are chosen in accordance with the useful area of the tank 11 in which it will be used. A rotor assembly 31 of this improved design having a maximum diameter of about 10 feet is suitable for use in aeration tanks about 15 feet in depth and having a capacity of about 1,000,000 gallons, whereas a rotor assembly having about 6 feet in outside diameter may be used in tanks having a capacity of about 200,000 gallons.

Although the preferred shape of the blades 39 is illustrated in the drawings, i.e., a one-quarter segment of the surface of a hemisphere, some variations in this shape are also suitable if other factors are properly controlled. Generally, it has been found that the front face of the blade 39 should be curved in the vertical plane, i.e., so that a vertical plane cutting through the blade (in its operatively mounted position) intersects the blade face along a curved line. Moreover, the blades 39 should be so shaped that substantially all of the fluid picked up by a blade is delivered to the upper edge 65 and does not slip off a side edge of the blade 39 before reaching the upper edge 65.

To prevent the fluid from discharging to one side or the other, the blades 39 are also curved in the horizontal plane, i.e., so that a horizontal plane cutting the blade intersects it along a curved line. Curvature in the horizontal plane not only prevents the fluid from slipping off the side edges of the blade, but it also effectively spreads the fluid picked up into a thin film.

For such a double-curved blade, i.e. curved in both the vertical and horizontal planes, it has been found that there is an interrelationship between the two respective radii of curvature of the blade 39 which results in efficient performance. Although equivalent irregular double-curved surfaces may be employed, the preferred blade is best described with reference to a regular surface. Preferably, the blade is a section of a double-curved surface of revolution such as a sphere, ellipsoid, paraboloid or hyperboloid. The ratio of the radius of curvature in the vertical plane to the radius of curvature in the horizontal plane (as operatively mounted blades) should lie between about 1.5 to 0.5. The measurements of these radii are taken in horizontal and vertical planes which pass through the focal point of the surface of revolution, or if the horizontal plane thru the focal point would not intersect the segment of the surface of revolution, the highest horizontal plane which intersects the blade is used.

The design of the bottom of the blade 39 determines the characteristics of the entry or drag of the blade in the fluid being treated and is considered to be important to achieve the desired performance. There should be a substantial difference between the length of the lower edge 63 of the blade 39 and the length of the upper edge 65 to provide the desired amount of thinning out of the fluid film as it travels upward along the face 55 of the blade 39. The upper edge 65 should be at least twice as long as the lower edge 63. In the illustrated embodiment, the lower edge is a point 63 so the upper edge 65 is infinitely longer than the lower. When the point 63 of the blade 39 is blunted, the above-stated relationship applies more meaningfully.

For the rotor 25 to perform in its intended manner, it is important that the blades 39 have the lower edges, i.e., front plow-points 63, at a level substantially below the level of the upper trailing edges 65, so that the desired plowing or pick-up action is created. It is also important for the upper edge 65 to be above the equilibrium level of fluid during rotation of the rotor 25, and preferably also above the quiescent level of fluid in the tank 11. As viewed in FIGURE 3, the rotor assembly 31 is designed for rotation in a clockwise direction with the plow-point 63 of the blade 39 leading the trailing upper edge 65. In the preferred embodiment, the disposition and shape of the blade 39 is such that curved surface of the blade 39 extending downward to the front point 63 is approximately tangent to the horizontal plane passing through the point.

The portion of fluid picked up by each blade 39 flows generally upward along its curved surface 55 and, upon discharge, is propelled upward with a relatively steep trajectory and tangentially outward of the circular path of the blades. The fluid leaves the trailing edge 65 in the form of a laterally expanding sheet or film which is believed to be cut on the edge 65. In the preferred embodiment, the blades 39 are mounted so that the curved blade surface 55 is at its upper edge approximately tangent to a vertical plane passing thru a point on the line of the upper edge 65 so that the fluid being discharged from the blade leaves with a substantial vertical component of velocity (it having also a horizontal component from its rotary movement with the blade). However, the blades 39 may be tilted a few degrees either way from such orientation.

Mounting of the blades 39 by the bolts 41 through the apertures 59 in the lugs 57 allows angular positioning of the blade orientation relative to a radius of the rim 43. The speed and the angular position of the blades 39, and consequently the manner in which the blades contact the fluid during rotation, are important in obtaining efficient performance. If these factors are not properly controlled, either the amount of fluid flowing over the upper edges 65 may be reduced or the fluid may not be controlled over the face of the blades, with consequent reduction in aeration. Moreover, the desired circulation through the tank may not be produced.

On the basis of experiments, it is indicated that, for blades 39 which are sections of a sphere, the radial angle E (see FIGURE 4) between two radial lines 66 and 67, extending from the center of hub 47 and, respectively, through the radially outer corner 68 of the trailing edge 65 and through the inner corner 69, should be within the range of about −40 degrees to +20 degrees, and preferably between 0° and −10°. With respect to the radial angle E, a plus number of degrees signifies that, relative to rotation of the rotor 25, the radius 66 passing through the outer corner 68 passing through the inner corner 69, whereas a minus number of degrees signifies that the radius 66 is angularly behind the radius 67 relative to the direction of rotation.

A modified form of the rotor assembly 31 is shown in FIGURE 3. In this modified version, a baffle 15' is supported by appropriate braces 71 which connect to the rotor assembly 31. In this construction, the baffle 15' is essentially integral with the rotor assembly 31 and thus rotates with it. This version eliminates the need for the struts 17 and stays 19 and affords some saving in cost. Moreover, the interconnection of the rotor assembly 31 and the baffle 15' is believed to provide stabilizing effect on the rotating of the rotor assembly 31 which may reduce bearing wear.

The following example illustrates an aeration apparatus embodying various features of the present invention. It should be fully understood that the example is given for illustrative purposes and does not constitute limitations upon the scope of the invention.

EXAMPLE

An aeration apparatus generally as shown in FIGURE 1 is installed in a circular tank 70 feet in diameter and approximately 16 feet deep. In an operation, the tank was filled with approximately 470,000 gallons of water.

The rotor assembly 31 had a diameter D of 8.5 feet and carried twenty-four blades 39 which were spaced at 15° angular intervals. Each of the blades 39 had a front face 55 which approximated the surface area and configuration of a ⅛ section of a sphere of 13 inch radius. The blades 39 were positioned so that the angle E measured about −3°. The blades 39 were located so that the curved front surface was tangent to the vertical at its rear edge 65 and tangent to the horizontal at the front point 63. The rotor 25 was supported so that the level of fluid in the tank at quiescent condition (before beginning aeration) was such that the points 63 of the blades 39 were submerged about 10 inches below the upper surface of the fluid. The temperature of the water at test conditions is about 11.5° C.

The rotor 25 was driven at about 37 r.p.m. using a shaft horsepower which measured about 57.5 HP. Under these conditions, the pumping rate calculates to 40,000 g.p.m. The amount of oxygen which was dissolved into the water by the rotating aerator was measured by the following procedure. About 10 p.p.m. of cobalt sulphate, a catalyst, was initially added to the contents of the tank and then, with the aerator operating, a substance was added to remove the dissolved oxygen that was initially present in the water to establish a base of zero from which measurements could meaningfully be made. For water having dissolved oxygen concentration of about 10 p.p.m., approximately one pound of dry sodium sulfite was added per 1,000 gallons, to provide a slight excess.

Aeration was then begun and sets of samples were withdrawn at about 2 minute intervals from representative locations in the tank and monitored to determine the increase in D.O. Six sets were taken between 10% and 70% of saturation of the water in the tank with oxygen.

Calculations show that, at the above-specified operating conditions, about 216 pounds of oxygen were dissolved into the water per hour of operation. This calculates to an oxygenation capacity efficiency of 3.75 pounds of oxygen per horsepower-hour (O.C./HP./hour), which is considered to be excellent performance for a surface aerator of this size and to be a considerable improvement over values previously obtainable competitive surface aeration equipment.

A second run was made using the same aerator. During the second run a r.p.m. of 37 was maintained and the calculated shaft horsepower was about 58.0. This also gave a calculated pumping rate of 40,000 g.p.m. The remainder of the conditions set forth above were the same. The results of this test show that approximately 204 pounds of oxygen were dissolved in the water per hour of operation, giving an O.C./HP./hour value of 3.52.

The rotor assembly 31 was then changed so as to carry 36 blades uniformly spaced 10° angular intervals. This rotor assembly with the 36 blades was lowered slightly so that the points 63 of the blades are submerged about 11 inches below the quiescent surface level of the water. Each blade was again an ⅛ segment of a sphere of 13 inches radius and was mounted so that the curved surface of the blade face 55 is approximately tangent to the vertical at the trailing rear edge 65 and was approximately tangent to the horizontal at the point 63. The blades were mounted so that the angle E formed between the two radii, as hereinbefore described, measures about —3°.

The rotor was again driven at 37 r.p.m., and the shaft horsepower calculated to be about 70 HP. The calculated pumping rate is 50,000 g.p.m. Under these conditions, tests showed that about 240 pounds of oxygen were dissolved into the water per hour of operation. This calculates to an O.C./HP./hour value of 3.44 which is considered to be excellent.

The invention thus provides an improved aeration apparatus and method which produces a significant increase in the amount of oxygen which can be dissolved into a fluid body by surface aeration. The improved aeration apparatus is considered extremely valuable because, as the examples illustrate, it is capable of providing excellent efficiency of operation for large diameter, high-horsepower units. Although the reasons are not completely understood, many surface aerators, which in the form of small diameter units perform efficiently in small volume tanks, show a marked decrease in efficiency if an attempt is made to scale them up to larger diameter aerators. The efficiency of the aerator tested in the examples is considered to perform in substantial excess of efficiencies obtainable with comparable surface aeration units which have been heretofore considered to be among the finest available commercially.

Various of the features of the invention are set forth in the following claims.

What is claimed is:

1. Apparatus for use in a system for gasifying fluid contained in a treatment tank, which apparatus includes a rotor positioned at the upper level of the fluid in the tank for rotation about a generally vertical axis, said rotor including a plurality of blades which have leading lower edge portions and trailing upper edge portions with respect to the direction of rotation, each of said blades on said rotor being curved in a vertical plane and in a horizontal plane; said blades being disposed concave to the direction of rotation with said leading edge portions at a lower level than said trailing edge portions and with said trailing upper edges being unobstructed rearwardly and upwardly therefrom so as to (a) pick up portions of the fluid when said rotor is rotated with the lower leading edge portions dipping into the fluid in the tank and (b) discharge the fluid upwardly and generally outwardly of the circular path of the blades.

2. Apparatus as set forth in claim 1 wherein said upper edge of each blade is at least twice the length of the lower edge thereof.

3. Apparatus as set forth in claim 1 wherein said blades are mounted with said curved blade surface at its upper edge approximately tangent to a vertical plane.

4. Apparatus as set forth in claim 1 wherein a cylindrical baffle surrounds the periphery of said rotor and extends downward therefrom into the fluid in the tank.

5. Apparatus as set forth in claim 1 wherein each of said blades is a section of a double-curved surface of revolution.

6. Apparatus as set forth in claim 5 wherein the ratio of the radius of curvature in the vertical plane to the radius of curvature in the horizontal plane is between about 1.5 and 0.5.

7. Apparatus as set forth in claim 1 wherein said blades are each approximately one-eighth sections of the surface of a sphere having a point of said section as the leading lower edge portion.

8. Apparatus as set forth in claim 7 wherein said lower edge portion is approximately tangent to a horizontal plane.

9. Apparatus as set forth in claim 7 wherein said blades are radially oriented with respect to radii extending horizontally from said vertical axis so that the disposition of a radial line passing through the outer corner of said upper edge relative to a radial line passing through the inner corner of said upper edge is from about —40° to +20° with respect to said direction of rotation.

10. A method of gasifying a body of fluid having its upper surface exposed to a gaseous medium, which method comprises rotating in a horizontal plane and around a vertical axis, a circumferentially spaced series of blades each of which is radially spaced from said axis, each blade having a vertically and horizontally curved front face which is concave toward the direction of rotation, said blade having a front plowing end and a relatively elevated rear upper end edge, said rotating being performed so that the lower front ends of said blades dip below the operative surface level of the body of fluid to a depth which is a minor fraction of the distance between the plane of rotation of the upper ends and the plane of rotation of the lower ends, whereby the rotating blades plow separate portions of the upper layer of the fluid and then cause said fluid portions to be spread thin on the concave surface and then cut on the elevated upper edge and projected upwardly so as to fall back onto the main body of liquid in a receiving zone which is located generally exterior of the circular path of movement of the blades.

References Cited

UNITED STATES PATENTS 1,759,315　5/1930　Kuehn _____ 261—91

FOREIGN PATENTS 27,072　　1911　Great Britain.
862,761　3/1961　Great Britain.

MORRIS O. WOLK, *Primary Examiner.*

MICHAEL E. ROGERS, *Examiner.*